United States Patent
Chadwell et al.

(10) Patent No.: US 12,326,025 B2
(45) Date of Patent: *Jun. 10, 2025

(54) INTEGRATED STOWAGE BIN ASSEMBLY

(71) Applicant: Harper Engineering Co., Renton, WA (US)

(72) Inventors: David Chadwell, Renton, WA (US); Richard J. LaConte, Black Diamond, WA (US)

(73) Assignee: Harper Engineering Co., Renton, WA (US)

( * ) Notice: Subject to any disclaimer, the term of this patent is extended or adjusted under 35 U.S.C. 154(b) by 220 days.

This patent is subject to a terminal disclaimer.

(21) Appl. No.: 18/053,611

(22) Filed: Nov. 8, 2022

(65) Prior Publication Data

US 2023/0228141 A1 Jul. 20, 2023

Related U.S. Application Data

(63) Continuation of application No. 17/007,703, filed on Aug. 31, 2020, now Pat. No. 11,519,211, which is a
(Continued)

(51) Int. Cl.
 *E05F 1/12* (2006.01)
 *B64D 11/00* (2006.01)
 *E05D 3/06* (2006.01)

(52) U.S. Cl.
 CPC .......... *E05F 1/1292* (2013.01); *B64D 11/003* (2013.01); *E05D 3/06* (2013.01); *E05Y 2900/50* (2013.01)

(58) Field of Classification Search
 CPC ......... E05F 1/1292; E05F 1/12; E05F 1/1091; E05F 1/10; E05F 3/18; E05F 3/224;
(Continued)

(56) References Cited

U.S. PATENT DOCUMENTS 3,512,211 A  5/1970 Bassan
3,979,573 A  9/1976 Burns et al.
(Continued)

FOREIGN PATENT DOCUMENTS

DE  10 2016 006 004 A1  11/2016
EP     3 053 830 A1       8/2016
(Continued)

OTHER PUBLICATIONS

International Search Report and Written Opinion for PCT/US2018/042321, mailed on Sep. 19, 2018, 7 pages.
(Continued)

*Primary Examiner* — William L Miller
(74) *Attorney, Agent, or Firm* — Seed IP Law Group LLP

(57) ABSTRACT

A stowage bin assembly includes a bin bucket assembly having a bin bucket which includes at least one sidewall, the at least one sidewall including a notch and the at least one sidewall having an interior surface. The stowage bin assembly also includes at least one hinge assembly. The at least one hinge assembly includes a housing which is received in the notch, the housing having an interior surface, wherein the interior surface of the housing is substantially flush with the interior surface of the at least one sidewall when the housing of the at least one hinge assembly is received in the notch. The stowage bin assembly also includes a stowage bin door pivotably coupled to the bin bucket assembly via the at least one hinge assembly, the stowage bin door moveable between an open position and a closed position. Related components, assemblies, and devices are also provided.

7 Claims, 13 Drawing Sheets

Related U.S. Application Data continuation of application No. 16/941,018, filed on Jul. 28, 2020, now Pat. No. 10,801,244, which is a continuation of application No. 16/036,048, filed on Jul. 16, 2018, now Pat. No. 10,760,315.

(60) Provisional application No. 62/533,575, filed on Jul. 17, 2017.

(58) Field of Classification Search
CPC ......... B64D 11/003; E05D 3/06; E05D 13/12; E05D 15/463; E05Y 2900/50; Y02T 50/40
See application file for complete search history.

(56) References Cited

U.S. PATENT DOCUMENTS

| | | | |
|---|---|---|---|
| 4,185,415 A * | 1/1980 | LaConte | E05D 3/06 |
| | | | 49/248 |
| 4,275,942 A | 6/1981 | Steidl | |
| 4,383,347 A | 5/1983 | La Conte | |
| 4,907,762 A | 5/1990 | Bock et al. | |
| 4,995,441 A | 2/1991 | Leist et al. | |
| 5,129,597 A | 7/1992 | Manthey et al. | |
| 5,383,628 A | 1/1995 | Harriehausen et al. | |
| 5,441,218 A | 8/1995 | Mueller et al. | |
| 5,820,076 A | 10/1998 | Schumacher et al. | |
| 5,934,615 A | 8/1999 | Treichler et al. | |
| 6,045,204 A | 4/2000 | Frazier et al. | |
| 6,164,592 A | 12/2000 | Stephan et al. | |
| 6,290,175 B1 | 9/2001 | Hart et al. | |
| 6,398,163 B1 | 6/2002 | Welch et al. | |
| 6,829,808 B2 | 12/2004 | Neukötter | |
| 7,090,314 B2 | 8/2006 | Burrows et al. | |
| 7,128,295 B2 | 10/2006 | Scown | |
| 7,481,397 B2 | 1/2009 | Steinbeck et al. | |
| 7,601,004 B2 | 10/2009 | Lamoree et al. | |
| 7,762,737 B2 | 7/2010 | Schmitz et al. | |
| 7,883,005 B2 | 2/2011 | Bock | |
| 7,887,008 B2 | 2/2011 | Lamoree et al. | |
| 8,650,713 B2 | 2/2014 | Migliorini | |
| 8,677,565 B2 | 3/2014 | Vanini | |
| 8,850,661 B2 | 10/2014 | Liermann | |
| 9,033,279 B2 | 5/2015 | Graf et al. | |
| 9,090,351 B1 | 7/2015 | Frazier et al. | |
| 9,205,924 B2 | 12/2015 | Geng | |
| 9,327,834 B2 | 5/2016 | Paulino et al. | |
| 9,371,674 B2 | 6/2016 | Daul et al. | |
| 9,789,963 B2 | 10/2017 | Savian | |
| 9,878,791 B2 | 1/2018 | Kammerer et al. | |
| 10,000,286 B2 | 6/2018 | Savian et al. | |
| 10,315,768 B2 | 6/2019 | Schörkhuber | |
| 10,407,963 B2 | 9/2019 | Salice | |
| 10,760,315 B2 | 9/2020 | Chadwell et al. | |
| 10,767,407 B2 | 9/2020 | Salice | |
| 10,801,244 B1 | 10/2020 | Chadwell et al. | |
| 10,820,701 B2 | 11/2020 | Sobolewski et al. | |
| 11,098,515 B2 | 8/2021 | Giovannetti | |
| 11,125,001 B2 | 9/2021 | Homner | |
| 11,192,650 B2 | 12/2021 | Fischer | |
| 11,293,208 B2 * | 4/2022 | Heimbach | E05D 3/02 |
| 11,352,823 B2 | 6/2022 | Chadwell et al. | |
| 11,648,879 B2 * | 5/2023 | Wuggetzer | B60R 5/003 |
| | | | 296/37.1 |
| 12,060,739 B2 * | 8/2024 | Rheaume | B64D 11/003 |
| 12,110,111 B2 * | 10/2024 | Weng | B64D 11/003 |
| 2002/0101090 A1 | 8/2002 | Steingrebe et al. | |
| 2003/0080247 A1 | 5/2003 | Frazier | |
| 2003/0116988 A1 | 6/2003 | Stelandre et al. | |
| 2005/0040287 A1 | 2/2005 | Stephan et al. | |
| 2006/0151668 A1 | 7/2006 | Scown | |
| 2007/0084966 A1 | 4/2007 | Haynes et al. | |
| 2007/0215293 A1 | 9/2007 | Stone et al. | |
| 2007/0253674 A1 | 11/2007 | Druckman et al. | |
| 2008/0055836 A1 | 3/2008 | Lamoree et al. | |
| 2008/0078871 A1 | 4/2008 | Munson et al. | |
| 2008/0083089 A1 | 4/2008 | Hoffman | |
| 2008/0112754 A1 | 5/2008 | Schmitz et al. | |
| 2008/0251640 A1 | 10/2008 | Johnson et al. | |
| 2009/0194635 A1 | 8/2009 | Ehlers et al. | |
| 2011/0011976 A1 | 1/2011 | Goehlich et al. | |
| 2011/0192935 A1 | 8/2011 | Schneider et al. | |
| 2011/0253837 A1 | 10/2011 | Lee et al. | |
| 2012/0012702 A1 | 1/2012 | Moritz | |
| 2012/0228898 A1 | 9/2012 | Dryja | |
| 2012/0273615 A1 | 11/2012 | Rafler | |
| 2013/0207529 A1 | 8/2013 | Kearsey et al. | |
| 2013/0233971 A1 | 9/2013 | Burrows | |
| 2014/0197721 A1 | 7/2014 | Savian et al. | |
| 2014/0260735 A1 | 9/2014 | Roberts et al. | |
| 2014/0283336 A1 | 9/2014 | Cloud et al. | |
| 2015/0307192 A1 | 10/2015 | Savian | |
| 2016/0075433 A1 | 3/2016 | Eakins | |
| 2016/0083090 A1 | 3/2016 | Savian | |
| 2016/0229537 A1 | 8/2016 | Scown et al. | |
| 2017/0283058 A1 | 10/2017 | Papke et al. | |
| 2017/0305551 A1 | 10/2017 | Kammerer et al. | |
| 2018/0209197 A1 | 7/2018 | Williams et al. | |
| 2018/0281955 A1 | 10/2018 | Boerschig | |
| 2018/0319501 A1 | 11/2018 | Schörkhuber | |
| 2020/0040633 A1 | 2/2020 | Rheaume | |
| 2021/0040786 A1 | 2/2021 | Heimbach | |
| 2022/0025694 A1 | 1/2022 | Singh et al. | |
| 2025/0100686 A1 * | 3/2025 | Cassou | B64D 11/003 |

FOREIGN PATENT DOCUMENTS

| | | | |
|---|---|---|---|
| EP | 3 412 571 A1 | 12/2018 | |
| WO | 2014/127161 A1 | 8/2014 | |
| WO | 2017/173431 A1 | 10/2017 | |
| WO | 2018/116084 A1 | 6/2018 | |

OTHER PUBLICATIONS

International Preliminary Report on Patentability for PCT/US2018/042321, mailed on Jan. 30, 2020, 8 pages.
Schematics that depict a product that was offered for sale at least as early as Aug. 18, 2021, 6 pages.
Woodworking, Jul./Aug. 2016, vol. 30, No. 4, p. 89.
Woodworking, Jan./Feb. 2017, vol. 31, No. 1, p. 89.
FDMC, Best Practices in Woodworking Technology & Business, Jan. 2017, p. 31.
Salice, "Air," Ed. 03—Jul. 2016, 16 pages.
Salice, "Air," Ed. 03—Aug. 2016, 20 pages.

* cited by examiner

INTEGRATED STOWAGE BIN ASSEMBLY

BACKGROUND

Technical Field

The present disclosure generally relates to aircraft stowage bin assemblies.

Description of the Related Art

Transportation vehicles, such as airplanes, for example, typically include overhead storage compartments to allow passengers to store luggage, equipment, and other types of payload. The overhead storage compartments comprise overhead stowage bin assemblies. The overhead stowage bin assemblies are typically arranged to be above the passenger seats located in an aircraft's cabin. Thus, overhead stowage bin assemblies are often positioned at outboard ends of the left and right sides of the fuselage above the outboard cabin seats, and at the center of the fuselage, above the center cabin seats.

The stowage bin assemblies generally include bin buckets that are pivotably coupled to stowage bin doors. The stowage bin doors are configured to pivotably move between open and closed positions. The stowage bin doors pivotably rotate relative to respective pivot axes that are substantially parallel to the longitudinal axis of the fuselage, i.e., an axis that runs parallel to the forward-aft direction of the fuselage. The pivotable movement of the stowage bin doors is facilitated through hinges and various latch mechanisms. In particular, hinges typically protrude outwardly from a wall of the bin bucket or other attaching structure to which they are attached. For example, in some instances, hinges or similar structures about which the stowage bin door pivotably rotates protrude outwardly from an inside surface of a sidewall of the bin bucket. Such hinges, however, reduce compactness of the stowage bin assemblies, reduce storage capacity of the bin buckets, and contribute to increased weight of the stowage bin assemblies.

BRIEF SUMMARY

Figure 1:
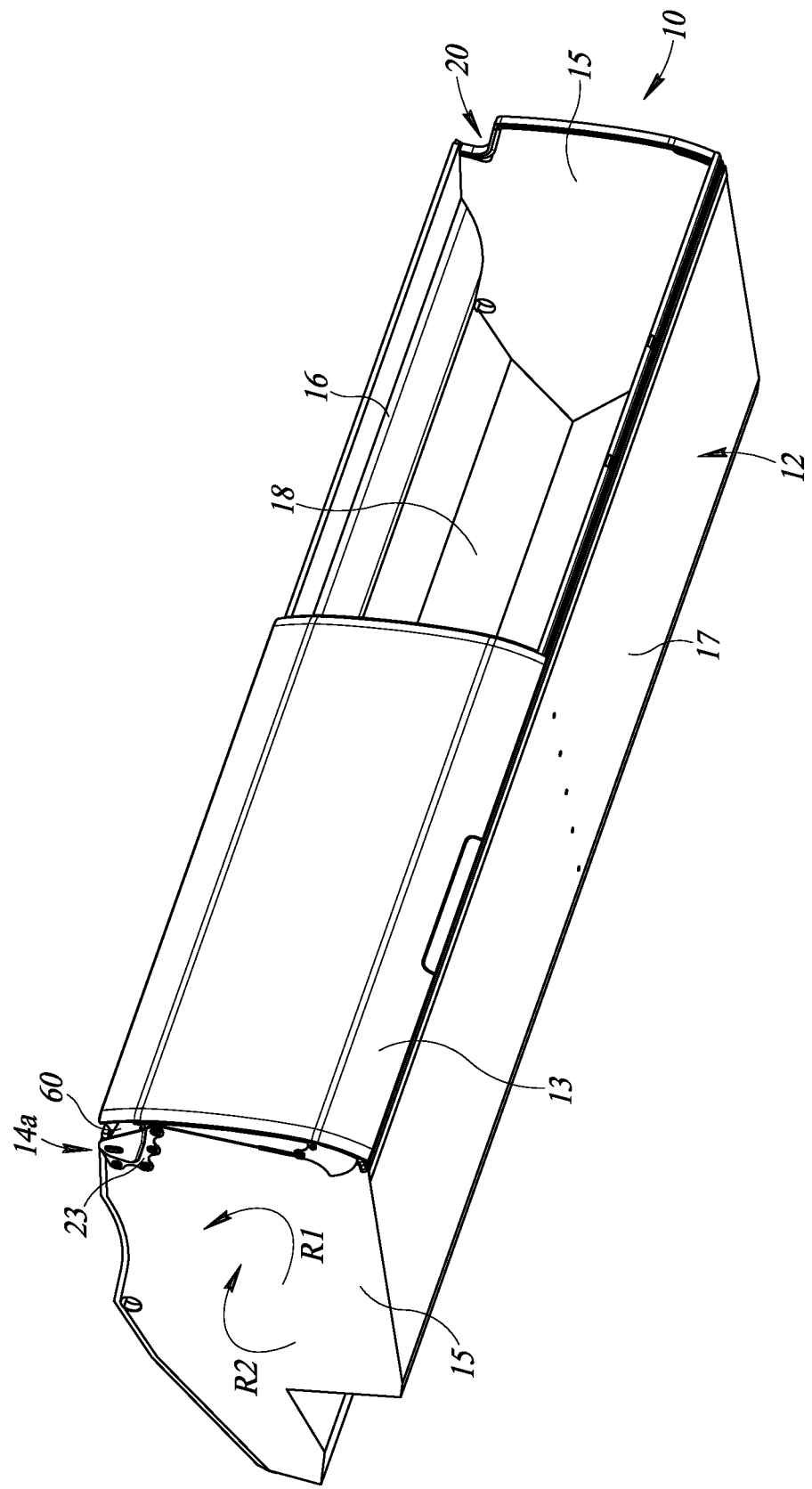
FIG. 1 is a partial, perspective view of an integrated stowage bin assembly, according to one example embodiment, with a stowage bin door removed for clarity of illustration and description.

Various embodiments of integrated stowage bin assemblies described herein improve manufacturing and assembling efficiencies, reduce weight footprint, and provide robust and compact form factors. For example, in one embodiment, a stowage bin assembly can be summarized as including a bin bucket assembly including a bin bucket having at least one sidewall, the at least one sidewall including a notch and the at least one sidewall having an interior surface; and at least one hinge assembly. The at least one hinge assembly can include a housing which is received in the notch, the housing having an interior surface, wherein the interior surface of the housing is substantially flush with the interior surface of the at least one sidewall when the housing of the at least one hinge assembly is received in the notch. The stowage bin assembly also includes a stowage bin door pivotably coupled to the bin bucket assembly via the at least one hinge assembly, the stowage bin door moveable between an open position and a closed position.

For example, in another embodiment, a hinge assembly that pivotably couples a stowage bin door to a stowage bin bucket assembly can be summarized as including a housing, a housing cover plate that couples to the housing, an interior cavity disposed between the housing and the housing cover, and a self-opening mechanism disposed in the interior cavity. The self-opening mechanism can be configured to counteract a gravitational torque applied by the stowage bin door when the stowage bin door moves between an open position and a closed position.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with stowage bin assemblies have not been shown or described in detail to avoid unnecessarily obscuring descriptions of the embodiments.

Unless the context requires otherwise, throughout the specification and claims which follow, the word "comprise" and variations thereof, such as "comprises" and "comprising," are to be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

Figure 2:
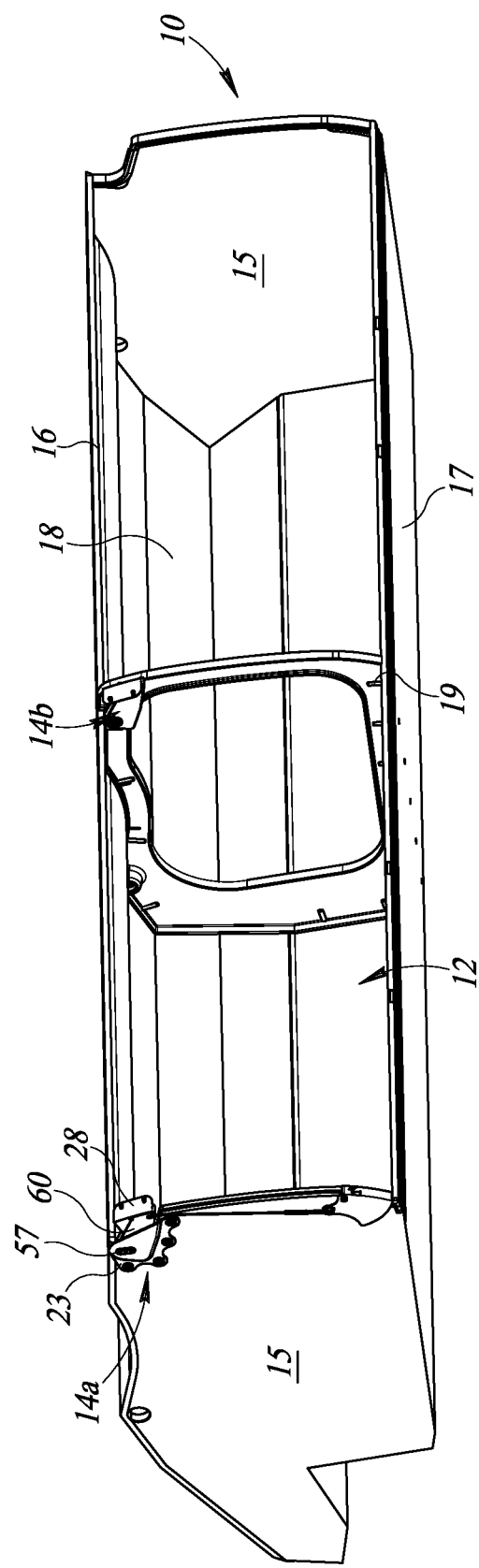
FIG. 2 is a partial, perspective view of the integrated stowage bin assembly of FIG. 1, with stowage bin doors removed for clarity of illustration and description.
Figure 3:
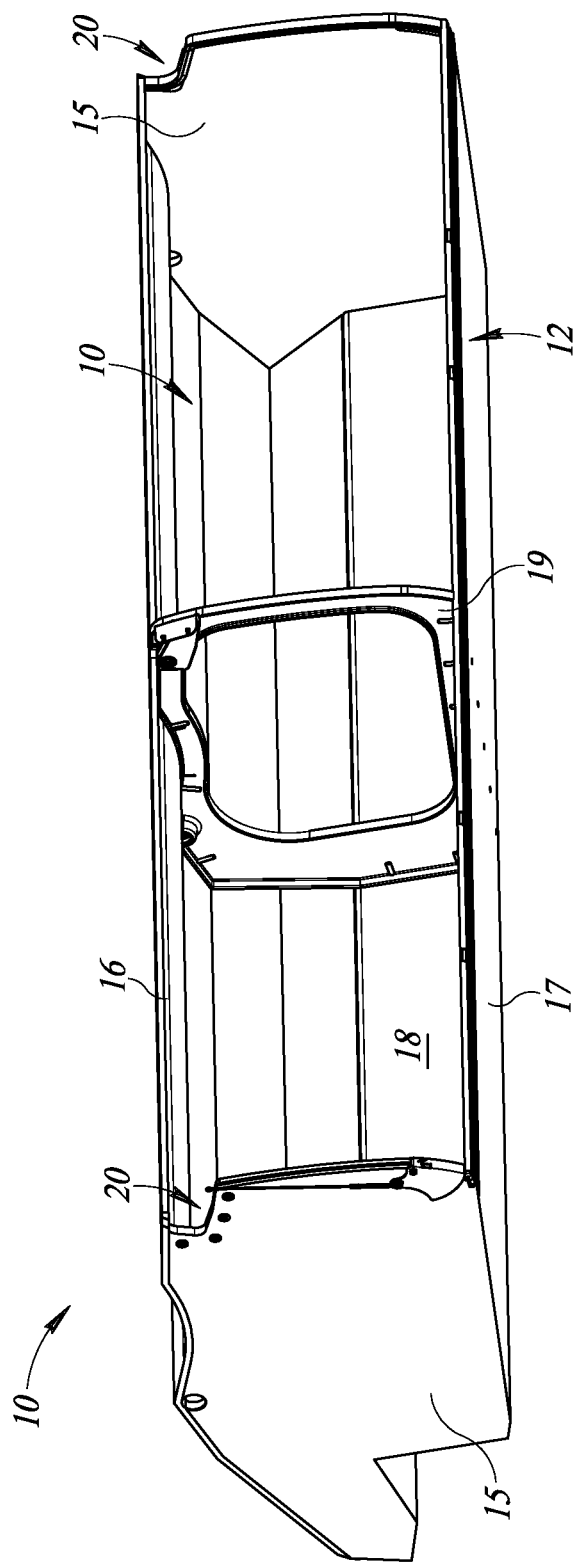
FIG. 3 is another partial, perspective view of the integrated stowage bin assembly of FIG. 1, with stowage bin doors and some of the hinge assemblies removed for clarity of illustration and description.

FIGS. 1 through 10 illustrate an integrated stowage bin assembly 10, according to one example embodiment. As illustrated in FIGS. 1-3, the integrated stowage bin assembly 10 includes a bin bucket assembly 12 and a pair of hinge assemblies 14a, 14b. In general, the bin bucket assembly 12 is hingedly coupled to a stowage bin door 13 via the hinge assemblies 14a, 14b. For example, FIG. 1 illustrates the integrated stowage bin assembly 10 having one stowage bin door 13, with another adjacent stowage bin door 13 removed for clarity of illustration and description. FIGS. 2-3 illustrate the integrated stowage bin assembly 10 with both stowage bin doors 13 removed for clarity of illustration and description. The stowage bin door(s) 13 are hingedly coupled to the bin bucket assembly 12 via the hinge assemblies 14a, 14b. It should further be noted that a hinge assembly 14a located adjacent to the hinge assembly 14b is not show for clarity of illustration and description. The bin bucket assembly 12 includes sidewalls 15, upper wall 16, lower wall 17, rear wall 18, and a partition 19 that partitions the integrated stowage bin assembly 10. In some embodiments, however, the partition 19 can comprise, in lieu of, or in addition to, another sidewall of the bin bucket assembly 12. For example, in some embodiments, an overall length of the integrated stowage assembly 10 may be less than an overall length of the illustrated integrated stowage bin assembly 10, such that the partition 19 is replaced with another sidewall 15.

Figure 4:
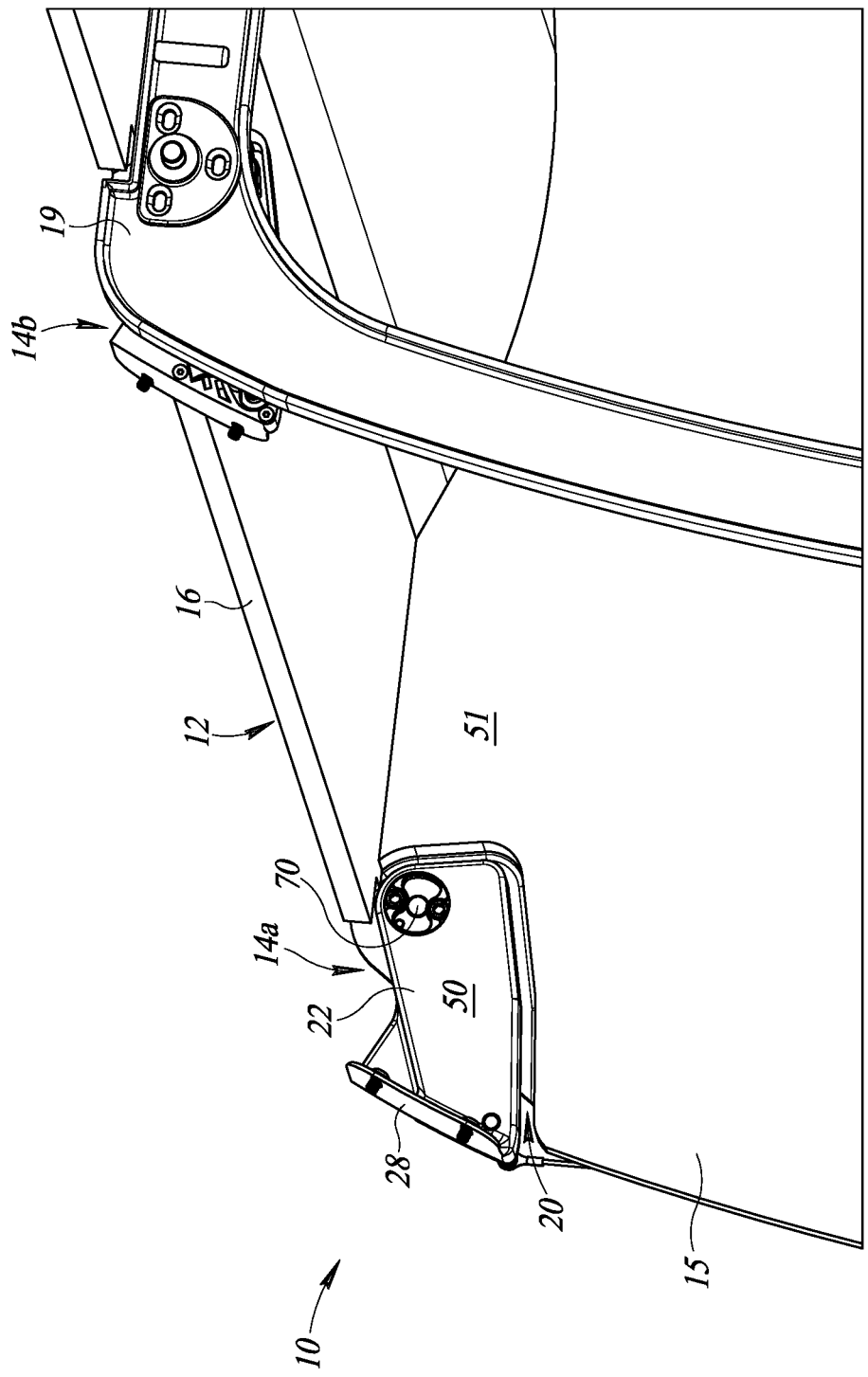
FIG. 4 is a partial, skewed side perspective view of the integrated stowage bin assembly of FIG. 1 as viewed from an inside of the integrated stowage bin assembly, with stowage bin doors removed for clarity of illustration and description.

As illustrated in FIGS. 1 through 10, in particular, FIGS. 3 and 4, one or more of the sidewalls 15 includes a notch 20 that is sized and shaped to receive the hinge assembly 14a. For example, FIG. 3 illustrates the integrated stowage bin assembly 10 including a pair of notches 20 disposed in the sidewalls 15. In particular, the notch 20 is sized and shaped in a manner such that the hinge assembly 14a is seated substantially flush with an interior surface of the sidewall 15, such that any protrusion of the hinge assembly 14a is reduced and/or minimized. The hinge assembly 14b is coupled to the partition 19. The notches 20 of each sidewall 15 are sized and shaped to receive the hinge assemblies 14a. In implementations where the integrated stowage bin assembly 10 includes a bin bucket assembly 12 with another sidewall in lieu of, or in addition to, the partition 19, a similar notch can be provided in such a sidewall, to which the hinge assembly 14b can be coupled in a similar manner.

The hinge assembly 14a is a mirror image of the hinge assembly 14b. Thus, for the sake of clarity of description and illustration, the hinge assembly 14a will be described in additional detail, although it should be understood, upon review of the present disclosure, that similar features are included in the hinge assembly 14b.

With continued reference to FIGS. 1-10, the hinge assembly 14a includes a housing 22 and an optional support plate 23. The housing 22 is sized and shaped to receive a self-opening mechanism 24 and a damper 26. The housing 22 after being received in the notch 20 is coupled to the sidewall 15 of the bin bucket assembly 12 via the optional support plate 23. The housing 22 includes an interior surface 50 that substantially aligns with an interior surface 51 of the sidewall 15. In this manner, the hinge assembly 14a when seated in the notch 20 of the sidewall 15 provides a compact integrated stowage bin assembly 10 that increases storage capacity of the bin buckets, and contributes to reduced weight of the stowage bin assemblies.

Figure 5:
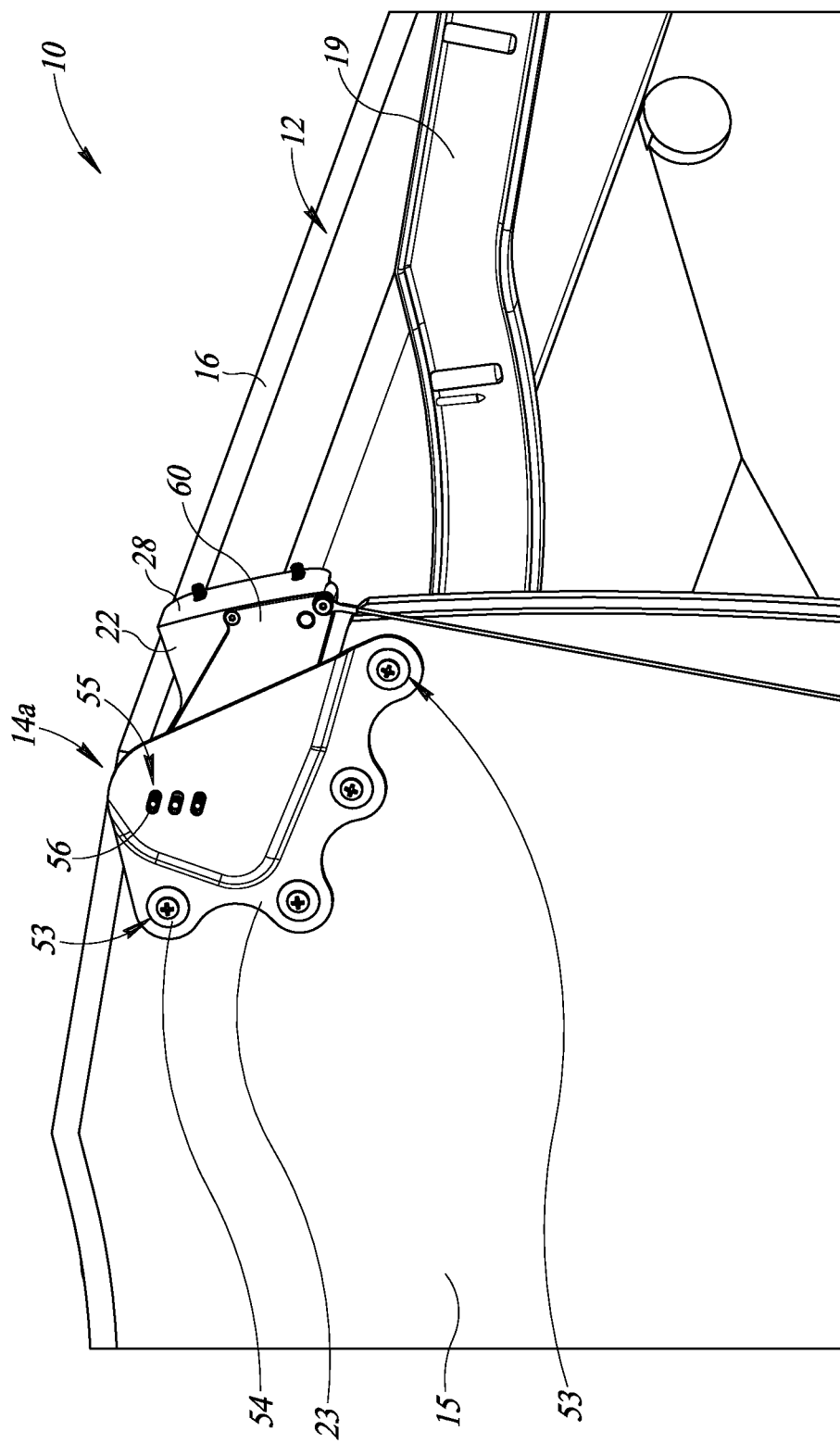
FIG. 5 is a partial, skewed side perspective view of the integrated stowage bin assembly of FIG. 1 as viewed from an outside of the integrated stowage bin assembly, with stowage bin doors removed for clarity of illustration and description.
Figure 6:
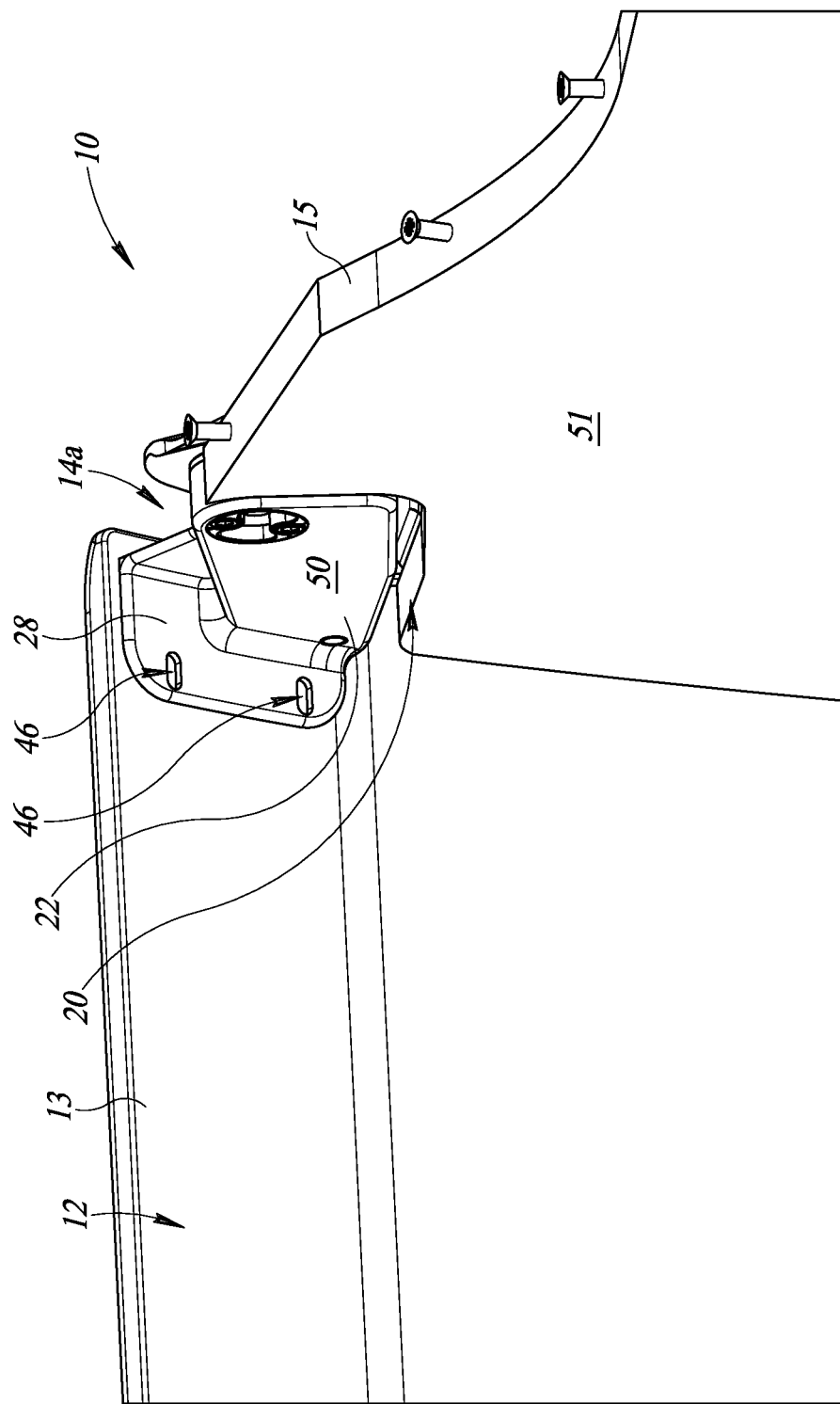
FIG. 6 is another partial, skewed front perspective view of the integrated stowage bin assembly of FIG. 1 as viewed from an inside of the integrated stowage bin assembly, with stowage bin doors removed for clarity of illustration and description.

Again, as illustrated in FIGS. 2 and 5, the optional support plate 23 is relatively thin to minimize the protrusion of the integrated stowage bin assembly 10. The optional support plate 23 includes a plurality of base apertures 53 that are disposed around a periphery of the optional support plate 23 and are sized and shaped to couple the hinge assembly 14a to the sidewall 15 via one or more plate fasteners 54. The optional support plate 23 also includes hinge apertures 55 that are shaped as slots to allow some positional movement of the hinge assembly 14a when coupling to the hinge assembly 14a via hinge fasteners 56, which are covered via a support plate cover 57 (not shown in FIG. 5 for clarity of description and illustration). As described above, the support plate 23 is optional. Thus, in embodiments of the integrated stowage bin assembly 10 that exclude the support plate 23, the hinge assembly 14a may be directly coupled to the sidewall 15 via one or more fasteners.

The housing 22 includes a coupling flange 28 that fixedly couples the integrated stowage bin assembly 10 to the stowage bin door 13, such that the stowage bin door 13 can rotate between open and closed positions. A housing cover plate 60 is sized and shaped to couple to the housing 22 around a periphery of the housing 22. When the housing 22 is coupled to the housing cover plate 60, such an arrangement defines an interior cavity within which certain components of the hinge assembly 14a are located.

Figure 7:
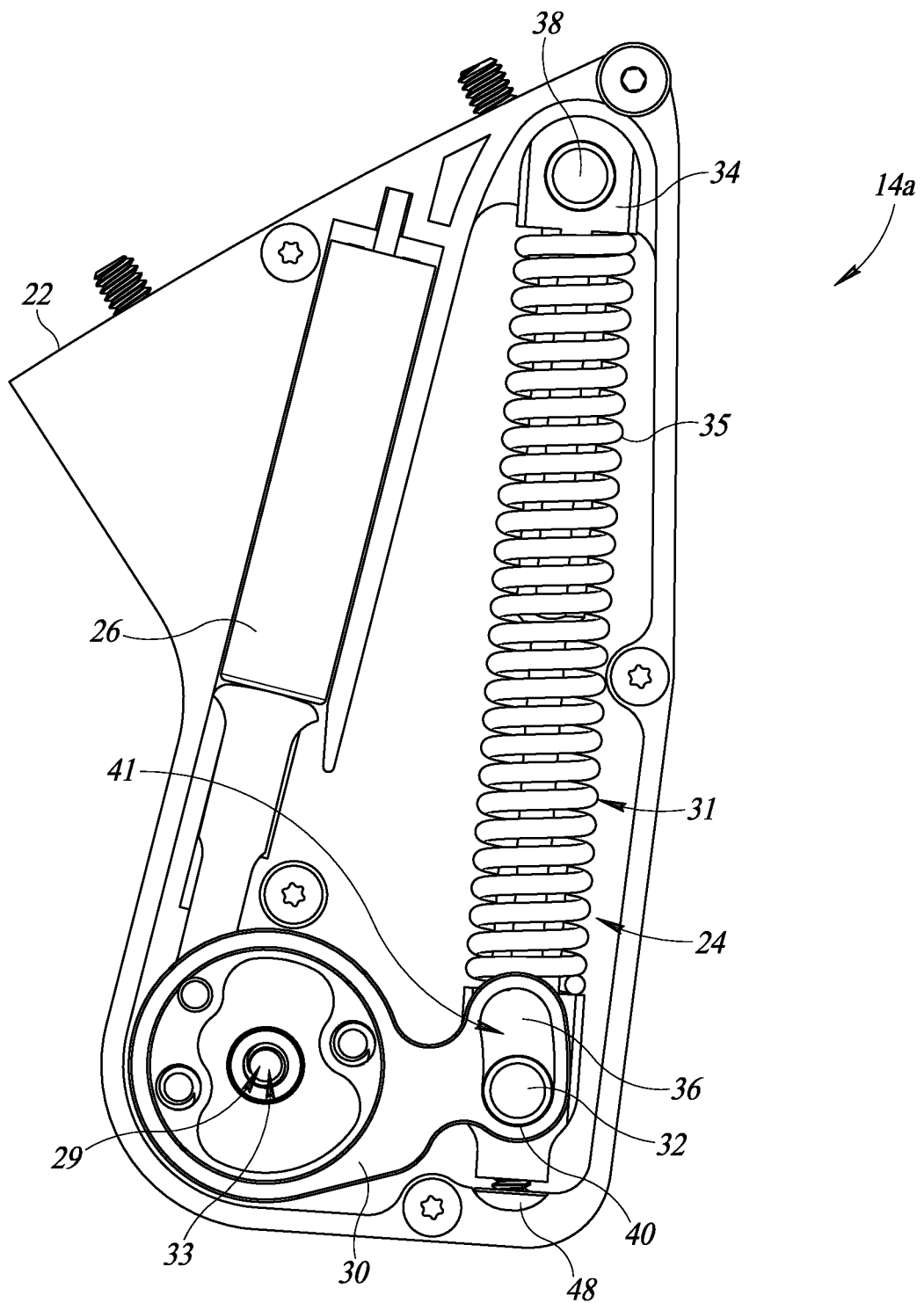
FIG. 7 is a plan view of a hinge assembly of FIG. 1, with certain components removed for clarity of illustration and description.
Figure 8:
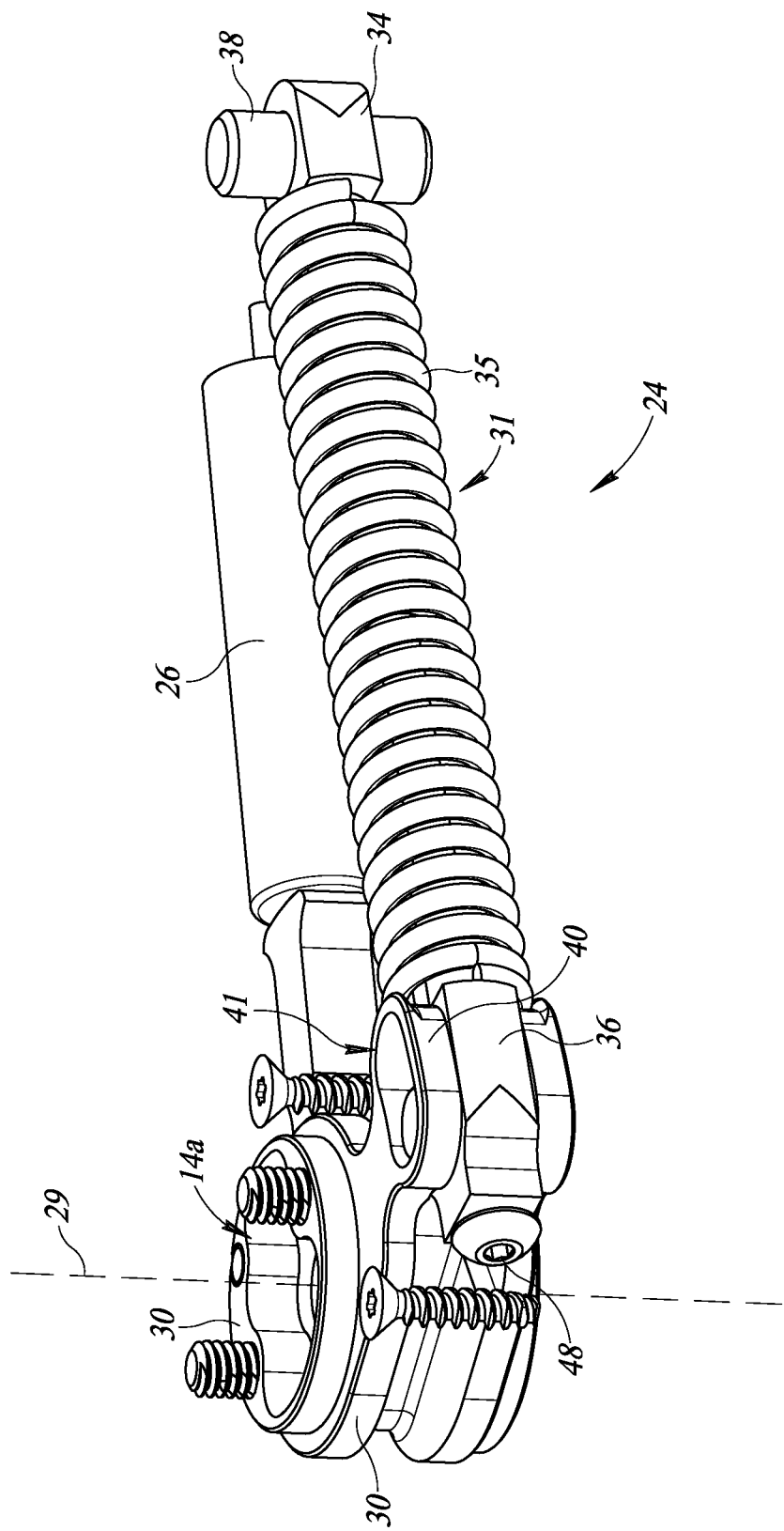
FIG. 8 is a skewed perspective view of the hinge assembly of FIG. 1, with certain components removed for clarity of illustration and description.

FIG. 7 illustrates the hinge assembly 14a with the housing cover plate 60 removed for the sake of clarity of description and illustration. FIG. 8 illustrates the hinge assembly 14a with the housing 22 and the housing cover plate 60 removed for the sake of clarity of description and illustration. Again, for the sake of clarity of description and illustration, only hinge assembly 14a is described in further detail. As illustrated in FIGS. 7 and 8, the hinge assembly 14a includes the damper 26 that is sized and shaped to control the rate of pivotable movement of the stowage bin door 13 between open and closed positions. Although one embodiment of the damper 26 is illustrated herein, in other embodiments, other dampers known in the art can be included in the hinge assembly 14a. The self-opening mechanism 24 is generally configured to provide a variable force that varies proportional to torque of the stowage bin door 13 that varies based, in part, on the variable gravitational torque of the stowage bin door 13. In particular, the stowage bin door 13 takes non-linear, radial paths R1, R2, respectively, as the stowage bin door 13 moves from and between the open and closed positions. As a result of the non-linear, radial paths R1, R2, the gravitational torque applied by the stowage bin door 13 results in a lateral force component that is applied toward or away from a pivot axis 29 depending on whether the stowage bin door 13 is moving from a closed to an open position or vice versa. In other words, a center of gravity of the stowage bin door 13 varies due to the non-linear, radial paths R1, R2. The self-opening mechanism 24 is configured to counteract such lateral force components by providing a variable counteracting force that can vary based on the non-linear, radial path of the stowage bin door 13.

In particular, the self-opening mechanism 24 includes a rotary crank 30, a biasing device 31, and rotary pin 32. The rotary crank 30 includes a pivot pin aperture 33 which is sized and shaped to pivotably couple the integrated stowage bin assembly 10 to the stowage bin door 13. For example, in some implementations, the stowage bin door 13 can be coupled to the hinge assembly 14a via a pivot pin 70 (FIG. 4) that is pivotably received in the pivot pin aperture 33. More particularly, the pivot pin aperture 33 defines the pivot axis 29 about which the stowage bin door 13 pivotably rotates between open and closed positions. The biasing device 31 includes a first connecting element 34, a spring 35, e.g., a compression spring, and a second connecting element 36. One end of the spring 35 is coupled to the first connecting element 34 and the other end of the spring 35 is coupled to the second connecting element 36. The first connecting element 34 includes a shaft that extends through the spring 35 and is coupled to the housing 22 via a first pin 38. The second connecting element 36 is coupled to the housing 22 via the rotary pin 32. The rotary pin 32 also couples the biasing device 31 to the rotary crank 30 via the rotary pin 32.

In particular, the rotary crank 30 includes an opening member 40 that includes an opening aperture 41 that is substantially shaped like a slot. The opening aperture 41 receives the rotary pin 32, and is sized and shaped to allow the rotary crank 30 to rotatably move therein as the spring 35 urges the opening member 40 toward a rear face of the housing 22. In this manner, the spring 35 applies a compressive force, for example, as applied to the opening member 40. Thus, as the stowage bin door 13 moves between the open and closed positions, a moment arm of the spring 35 changes proportionally to the gravitational torque applied by the stowage bin door 13, where the compressive forces applied by the spring 35 variably adjust as the opening aperture 41 allows the biasing device 31 to adjust its position to, in part, align with, and counteract the gravitational torque.

Figure 9:
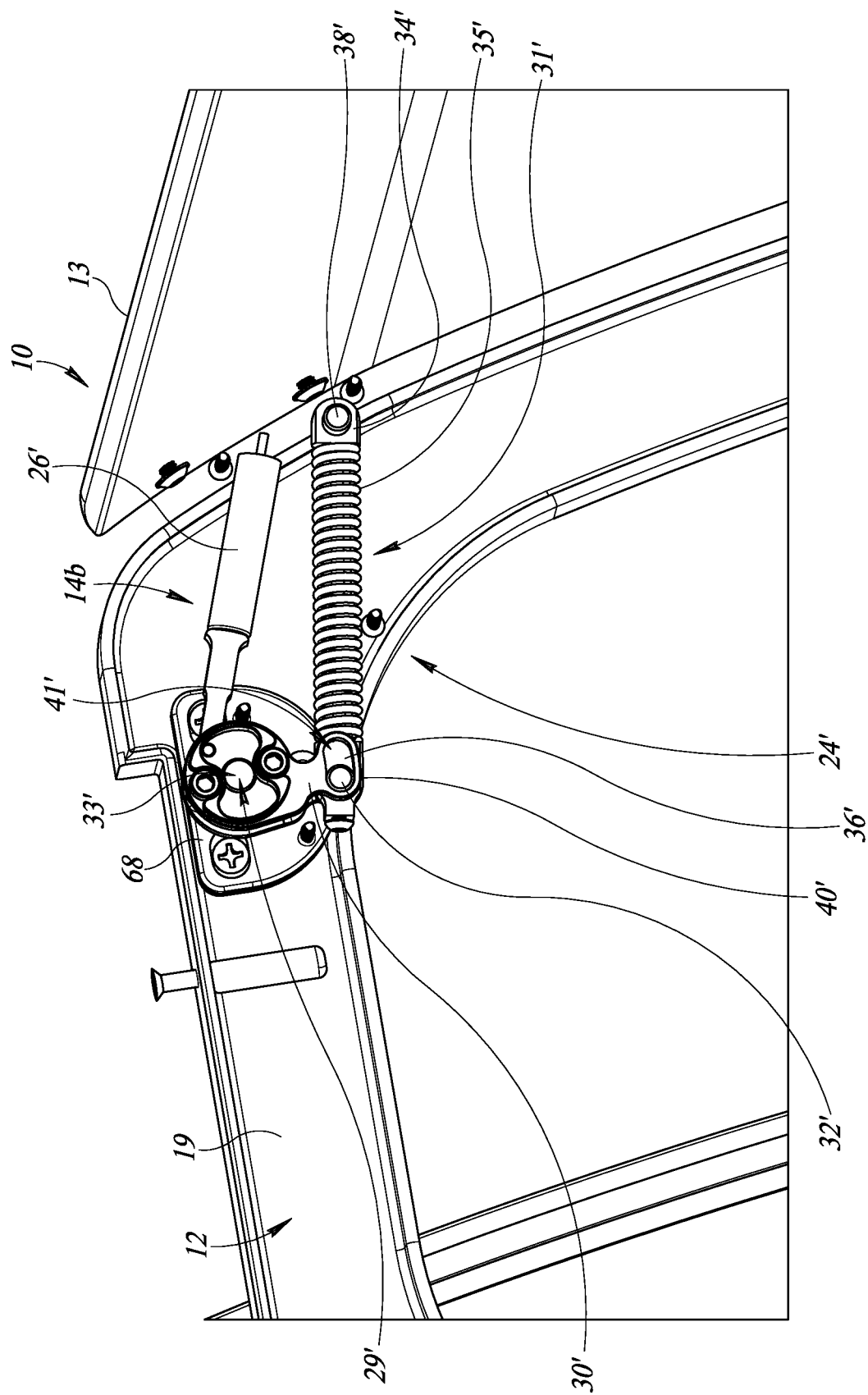
FIG. 9 is another partial, skewed side perspective view of the integrated stowage bin assembly of FIG. 1 as viewed from an inside of the integrated stowage bin assembly, with stowage bin doors and a housing of another hinge assembly of FIG. 1 removed for clarity of illustration and description.
Figure 10:
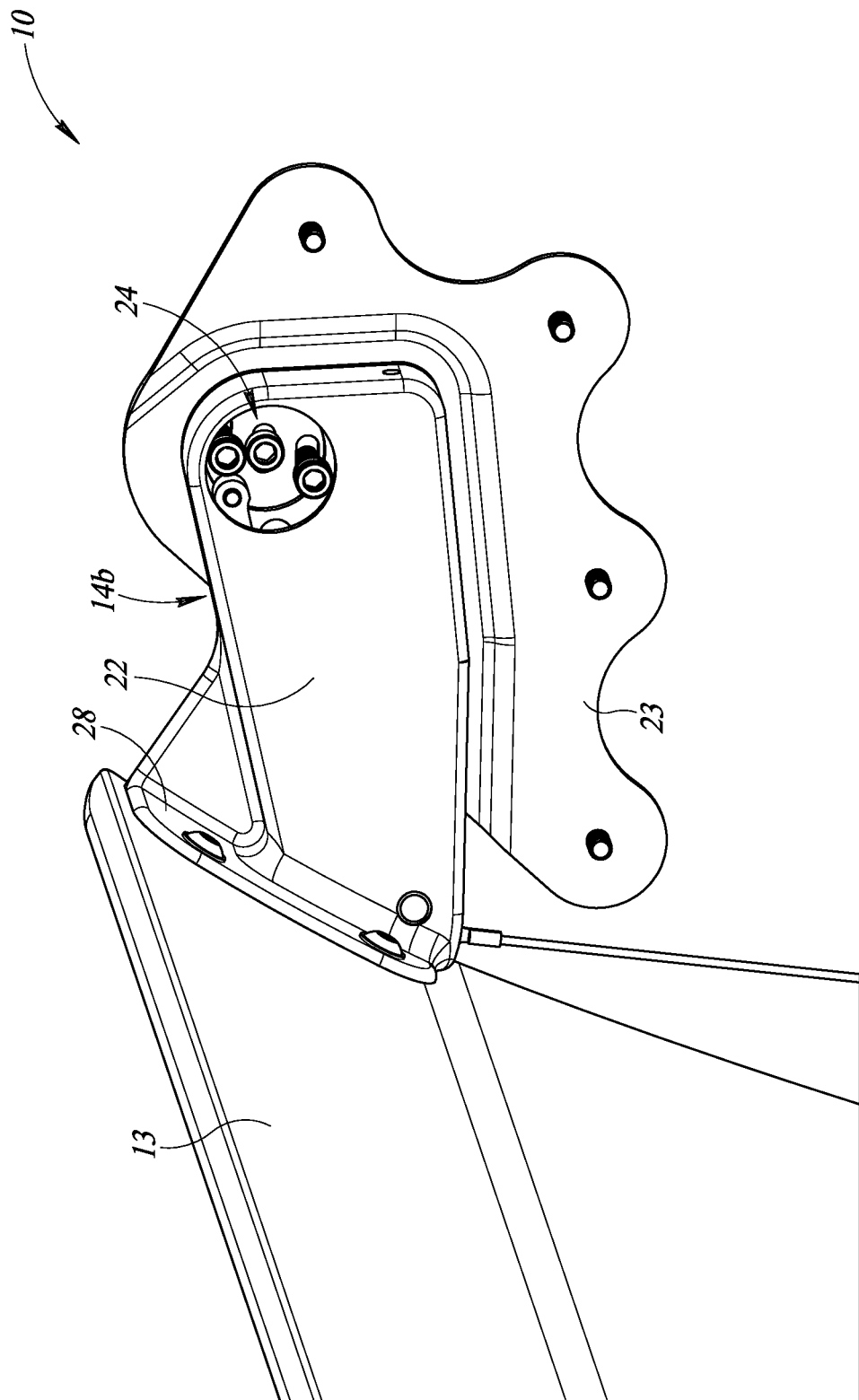
FIG. 10 is another partial, skewed side perspective view of the integrated stowage bin assembly of FIG. 1 as viewed from an inside of the integrated stowage bin assembly, with certain components removed for clarity of illustration and description.

As described above, the hinge assembly 14b is a mirror image of the hinge assembly 14a and includes similar components, including a self-opening mechanism 24' and a damper 26'. For example, FIG. 9 illustrates the hinge assembly 14b coupled to the partition 19 via an attaching plate 68. The self-opening mechanism 24' is synchronized with the self-opening mechanism 24, and also includes a rotary crank 30', a biasing device 31', and rotary pin 32'. The rotary crank 30' includes a pivot pin aperture 33' which is sized and shaped to pivotably couple the integrated stowage bin assembly 10 to the stowage bin door 13. For example, in some implementations, the stowage bin door 13 can be coupled to the hinge assembly 14b via a pivot pin that is pivotably received in the pivot pin aperture 33'. More particularly, the pivot pin aperture 33' defines the pivot axis 29' about which the stowage bin door 13 pivotably rotates between open and closed positions. The biasing device 31' includes a first connecting element 34', a spring 35', e.g., a compression spring, and a second connecting element 36'. One end of the spring 35' is coupled to the first connecting element 34', and the other end of the spring 35' is coupled to the second connecting element 36'. The first connecting element 34' includes a shaft that extends through the spring 35 and is coupled to the partition 19 via a first pin 38'. The second connecting element 36' is coupled to the partition 19 via the rotary pin 32'. The rotary pin 32' also couples the biasing device 31' to the rotary crank 30' via the rotary pin 32'.

In particular, the rotary crank 30' includes an opening member 40' that includes an opening aperture 41' that is shaped like a slot. As described above, the opening aperture 41' receives the rotary pin 32' and is sized and shaped to allow the rotary crank 30' to rotatably move therein as the spring 35' urges the opening member 40' toward a rear of the partition 19. In this manner, the spring 35' applies a compressive force, for example, as applied to the opening member 40'. Thus, as the stowage bin door 13 moves between the open and closed positions, a moment arm of the spring 35' changes proportionally to the gravitational torque applied by the stowage bin door 13, where the compressive forces applied by the spring 35' variably adjust as the opening aperture 41' allows the biasing device 31' to adjust its position to, in part, align with, and counteract the gravitational torque.

The integrated stowage bin assembly 10 includes one or more alignment features that allow the integrated stowage bin assembly 10 to be positionally moveable during assembly. For example, the coupling flange 28 includes at least one or more door coupling apertures 46 that are shaped like a slot to allow alignment of the integrated stowage bin assembly 10 in a first direction when coupled to the stowage bin door 13 or other surrounding structure, such as fuselage body components. For example, as described above, the optional support plate 23 includes hinge apertures 55 that are shaped as slots to allow some positional movement of the hinge assembly 14a in a second direction when coupling to the hinge assembly 14a via hinge fasteners 56 or other surrounding structure, such as fuselage body components. For example, the second connecting element 36 includes an alignment screw 48 that allows for angular positioning adjustment of the hinge assembly 14a, 14b when or during coupling to the stowage bin door 13 or other surrounding structure, such as fuselage body components.

Figure 11:
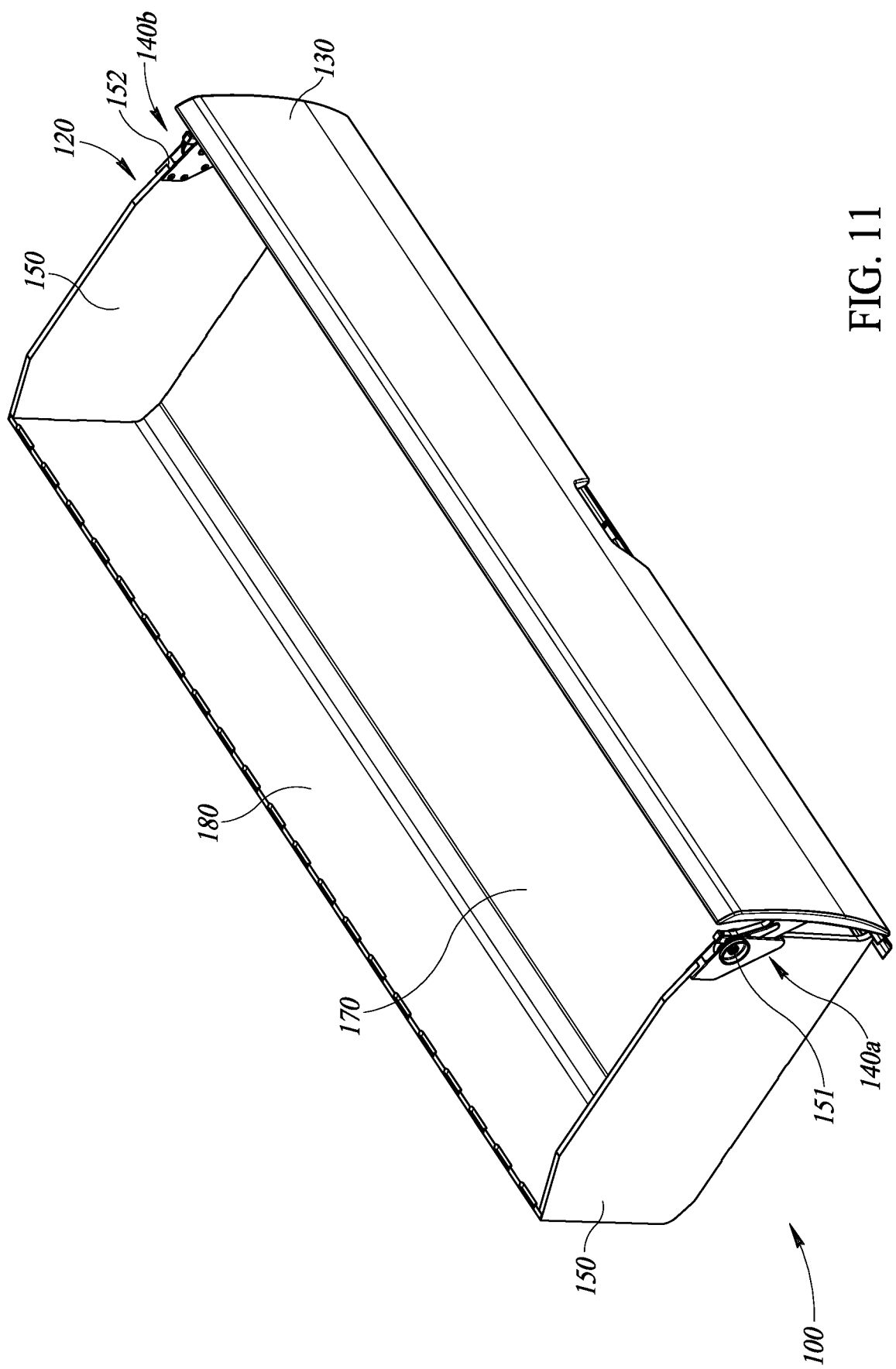
FIG. 11 is a perspective of an integrated stowage bin assembly, according to one example embodiment.
Figure 12:
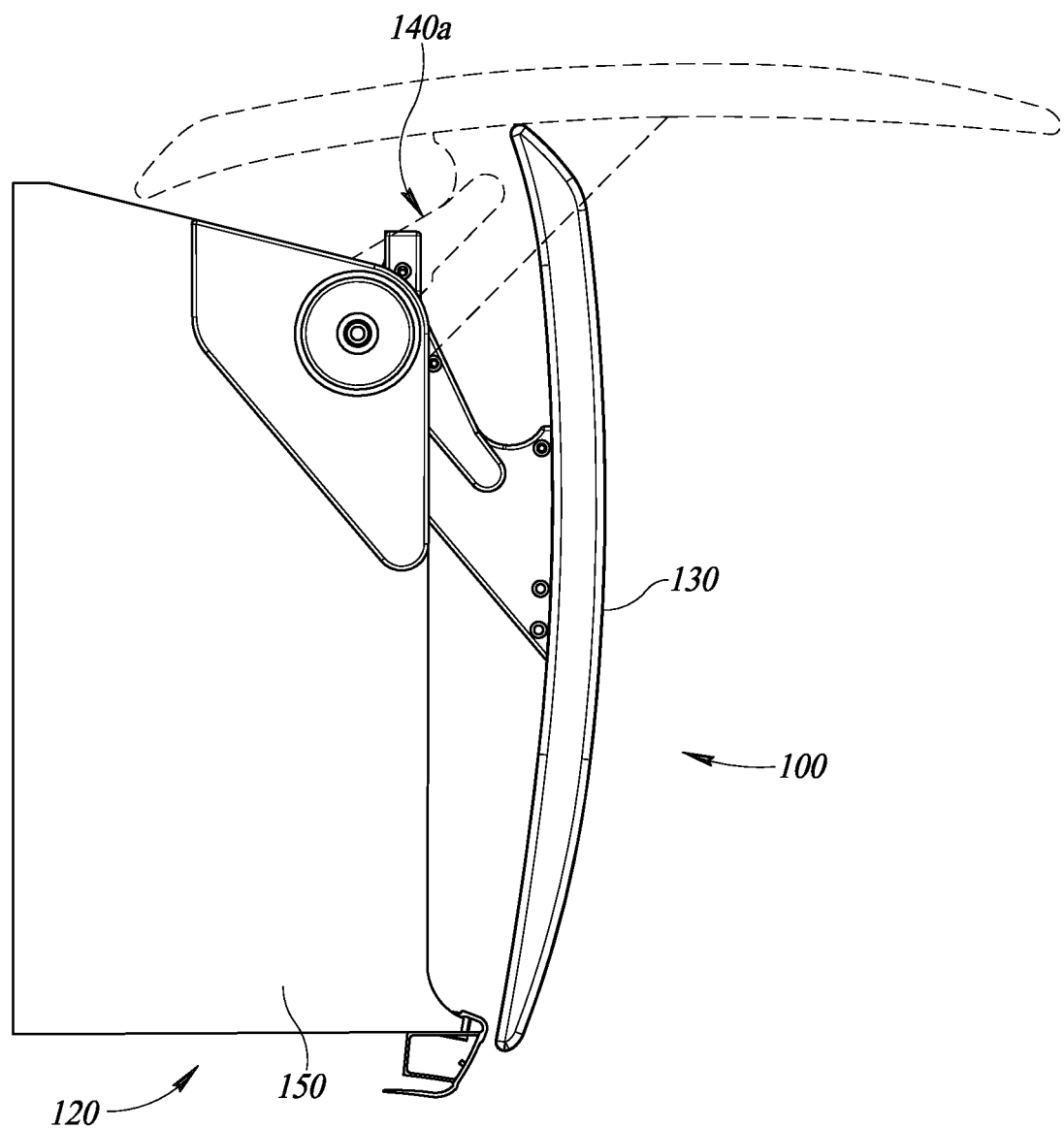
FIG. 12 is a side view of the integrated stowage bin assembly of FIG. 11.
Figure 13:
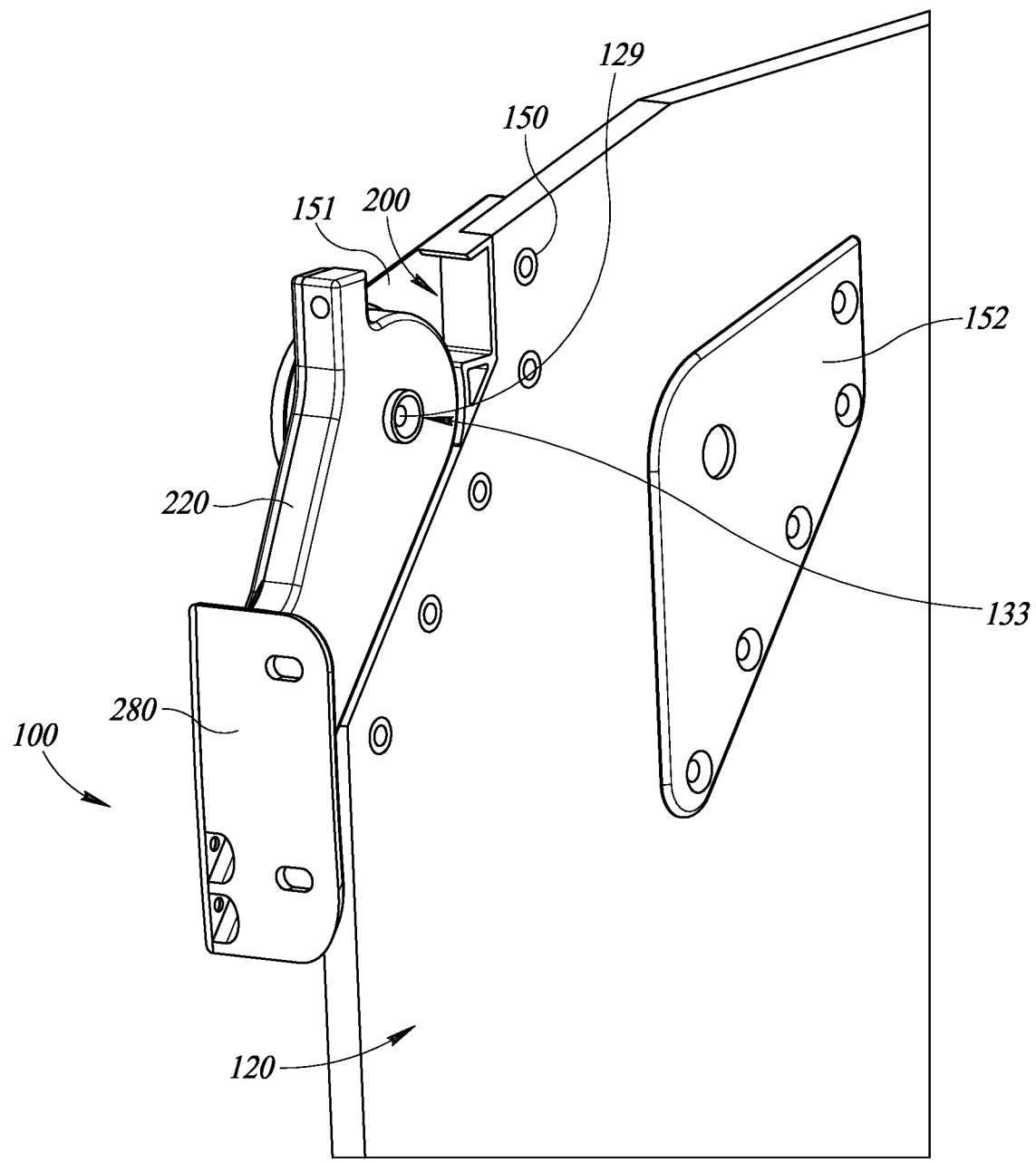
FIG. 13 is a side perspective, partially exploded view of the integrated stowage bin assembly of FIG. 11.

FIGS. 11 to 13 illustrate an integrated stowage bin assembly 100, according to another example embodiment. The integrated stowage bin assembly 100 includes a bin bucket assembly 120 and a pair of hinge assemblies 140a, 140b. In contrast to the integrated stowage bin assembly 10, the integrated stowage bin assembly 100 does not include a partition 19. In general, the bin bucket assembly 120 is hingedly coupled to a stowage bin door 130 via the hinge assemblies 140a, 140b. In this manner, as illustrated in FIG. 13, the stowage bin door 130 is moveable between open and closed positions. For example, FIG. 13 illustrates a closed position of the stowage bin door 130 and an open position illustrated in phantom lines. The bin bucket assembly 120 includes a pair of sidewalls 150, lower wall 170, a rear wall 180, and optionally an upper wall that is not shown for the sake of clarity of illustration and description.

Each hinge assembly 140a, 140b is a mirror image of the other and is coupled to corresponding sidewalls 150 of the bin bucket assembly 120. In particular, each sidewall 150 includes a notch 200 that is sized and shaped to receive the corresponding hinge assembly 140a, 140b. Again, integrating the hinge assembly 140a, 140b in this manner reduces the protrusion of the hinge assemblies 140a, 140b. For the sake of clarity of description and illustration, the hinge assembly 140a will be described in further detail, although it should be understood, upon review of the present disclosure, that the other hinge assembly 140b includes similar features.

The hinge assembly 140a includes a housing 220 that houses various mechanisms, including a self-opening mechanism that counteracts the gravitational torque, and a damper(s) that controls the rate of pivotable movement of the stowage bin door 130. The housing 220 includes a coupling flange 280 that fixedly couples the integrated stowage bin assembly 100 to the stowage bin door 130, such that the stowage bin door 130 can rotate between open and closed positions. The hinge assembly 140a is received in the notch 200 and is secured to the sidewall 150 via support plates 151, 152. For example, FIG. 13 is a partially exploded view that illustrates the support plate 152 removed from the hinge assembly 140a. Again, the housing 220 includes a pivot pin aperture 133 that defines a pivot axis 129 about which the stowage bin door 130 pivotably rotates between open and closed positions.

The various embodiments described above can be combined to provide further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A stowage bin assembly, comprising:
   a bin bucket assembly including:
      a bin bucket having at least a first sidewall portion with a first internal surface and a first external surface;
      the bin bucket having a second sidewall portion with a second internal surface and a second external surface, the second sidewall portion located opposite the bin bucket from first sidewall;
      a lower wall portion;
      a rear wall portion, the first sidewall portion, the second sidewall portion, the lower wall portion, and the rear wall portion defining a volume for receiving payload; and
      a first notch in the first sidewall, the first notch having a transverse surface between the first internal surface and the first external surface;
   a first hinge assembly positioned in the first notch, the first hinge assembly including:
      a first housing having a first internal surface that is flush with the first internal surface of the first sidewall portion and a peripheral surface adjacent the transverse surface when the first housing is positioned in the first notch; and
   a stowage bin door pivotably coupled to the bin bucket assembly via the first hinge assembly, the stowage bin door being moveable between an open position and a closed position; wherein
      the first hinge assembly includes a self-opening mechanism configured to counteract a gravitational force exerted on the stowage bin door when it moves between the closed and open positions, the self-opening mechanism includes:
         a rotary crank having a pivot pin aperture, a center of the pivot pin aperture defining a pivot axis; and
         a pivot pin received in the pivot pin aperture, the pivot pin sized and shaped to pivotably couple the first hinge assembly to the stowage bin door.

2. The stowage bin assembly of claim 1 wherein the self-opening mechanism includes:
   an opening aperture disposed in the rotary crank; and
   a rotary pin received in the opening aperture, the rotary pin configured to allow the rotary crank to rotatably move within the opening aperture to counteract a gravitational torque when the stowage bin door moves between the open position and the closed position.

3. The stowage bin assembly of claim 2 wherein the self-opening mechanism includes:
   a biasing device coupled to the rotary crank, the biasing device applying a force that counteracts the gravitation torque when the stowage bin door moves between the open and closed positions.

4. The stowage bin assembly of claim 1, further comprising:
   a damper positioned in the housing, the damper sized and shaped to control a rate of pivotable movement of the stowage bin door between the open and closed positions.

5. A stowage bin assembly, comprising:
   a bin bucket assembly including:
      a bin bucket having at least a first sidewall portion with a first internal surface and a first external surface;
      the bin bucket having a second sidewall portion with a second internal surface and a second external surface, the second sidewall portion located opposite the bin bucket from first sidewall;
      a lower wall portion;
      a rear wall portion, the first sidewall portion, the second sidewall portion, the lower wall portion, and the rear wall portion defining a volume for receiving payload; and
      a first notch in the first sidewall, the first notch having a transverse surface between the first internal surface and the first external surface;
   a first hinge assembly positioned in the first notch, the first hinge assembly including:
      a first housing having a first internal surface that is flush with the first internal surface of the first sidewall portion and a peripheral surface adjacent the transverse surface when the first housing is positioned in the first notch;
   a stowage bin door pivotably coupled to the bin bucket assembly via the first hinge assembly, the stowage bin door being moveable between an open position and a closed position; wherein
      the first hinge assembly includes a self-opening mechanism configured to counteract a gravitational force exerted on the stowage bin door when it moves between the closed and open positions; and
   a damper positioned in the housing, the damper sized and shaped to control a rate of pivotable movement of the stowage bin door between the open and closed positions.

6. The stowage bin assembly of claim 5 wherein the self-opening mechanism includes:
   a rotary crank having a pivot pin aperture, a center of the pivot pin aperture defining a pivot axis;
   a pivot pin received in the pivot pin aperture, the pivot pin sized and shaped to pivotably couple the first hinge assembly to the stowage bin door;
   an opening aperture disposed in the rotary crank; and
   a rotary pin received in the opening aperture, the rotary pin configured to allow the rotary crank to rotatably move within the opening aperture to counteract a gravitational torque when the stowage bin door moves between the open position and the closed position.

7. The stowage bin assembly of claim 6 wherein the self-opening mechanism includes:
a biasing device coupled to the rotary crank, the biasing device applying a force that counteracts the gravitation torque when the stowage bin door moves between the open and closed positions.

* * * * *